United States Patent
Ikeyama (10) Patent No.: US 12,226,742 B2
(45) Date of Patent: Feb. 18, 2025

(54) METHOD FOR MANUFACTURING POROUS MEMBRANE AND POROUS MEMBRANE

(71) Applicant: FUJIFILM Corporation, Tokyo (JP)

(72) Inventor: Akihiro Ikeyama, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 747 days.

(21) Appl. No.: 17/319,730

(22) Filed: May 13, 2021

(65) Prior Publication Data

US 2021/0260538 A1 Aug. 26, 2021

Related U.S. Application Data

(63) Continuation of application No. PCT/JP2019/046687, filed on Nov. 29, 2019.

(30) Foreign Application Priority Data

Nov. 30, 2018 (JP) ................................. 2018-225127

(51) Int. Cl.
*B01D 71/68* (2006.01)
*B01D 67/00* (2006.01)
(Continued)

(52) U.S. Cl.
CPC .......... *B01D 71/68* (2013.01); *B01D 67/0011* (2013.01); *B01D 67/0013* (2013.01);
(Continued)

(58) Field of Classification Search
CPC ...... B01D 71/68; B01D 71/381; B01D 71/44; B01D 71/441; B01D 67/0011;
(Continued)

(56) References Cited

U.S. PATENT DOCUMENTS

| 4,720,343 A | * | 1/1988 | Walch | B01D 69/02 210/500.33 |
| 4,840,733 A | * | 6/1989 | Sasaki | B01D 69/06 210/500.41 |

(Continued)

FOREIGN PATENT DOCUMENTS

| CN | 1150918 A | 6/1997 |
| CN | 1819867 A | 8/2006 |

(Continued)

OTHER PUBLICATIONS

Chinese Office Action dated Jun. 9, 2023 in Chinese Application No. 201980076400.1.

(Continued)

*Primary Examiner* — Liam Royce
(74) *Attorney, Agent, or Firm* — Sughrue Mion, PLLC (57) ABSTRACT

The present invention provides a method for manufacturing a porous membrane having high water permeability and hydrophilicity, which is not easily affected by a treatment such as washing, the method including: preparing, as a substrate, a membrane having a plurality of pores, which includes a water-insoluble resin such as polysulfone and a water-soluble resin including a monomer unit of polyvinylpyrrolidone or a monomer unit of polyvinyl alcohol; and irradiating the substrate with an electron beam in the presence of an aqueous solvent to crosslink at least a part of the water-soluble resin.

24 Claims, 1 Drawing Sheet

(51) Int. Cl.
  *B01D 69/10* (2006.01)
  *B01D 69/12* (2006.01)
  *B01D 71/38* (2006.01)
  *B01D 71/44* (2006.01)

(52) U.S. Cl.
  CPC ....... *B01D 69/1071* (2022.08); *B01D 69/125* (2013.01); *B01D 71/381* (2022.08); *B01D 71/441* (2022.08); *B01D 2323/30* (2013.01); *B01D 2323/34* (2013.01); *B01D 2325/022* (2013.01); *B01D 2325/023* (2013.01); *B01D 2325/0283* (2022.08); *B01D 2325/04* (2013.01); *B01D 2325/20* (2013.01); *B01D 2325/36* (2013.01)

(58) Field of Classification Search
  CPC .............. B01D 67/0013; B01D 67/009; B01D 67/006; B01D 69/10; B01D 69/125; B01D 69/14; B01D 69/02; B01D 2323/30; B01D 2323/34; B01D 2323/12; B01D 2323/2187; B01D 2325/02; B01D 2325/022; B01D 2325/023; B01D 2325/04; B01D 2325/20; B01D 2325/36
  See application file for complete search history.

(56) References Cited

U.S. PATENT DOCUMENTS

| | | | |
|---|---|---|---|
| 4,933,081 A | 6/1990 | Sasaki et al. | |
| 5,543,465 A * | 8/1996 | Bell | B01D 67/0088 521/53 |
| 2006/0157404 A1 | 7/2006 | Mullette et al. | |
| 2006/0191844 A1 * | 8/2006 | Mahuchi | B01D 67/0088 210/500.36 |
| 2007/0017914 A1 | 1/2007 | Shigesada et al. | |
| 2008/0214687 A1 * | 9/2008 | Muller | B01D 67/00111 521/53 |
| 2010/0190965 A1 * | 7/2010 | Yamaguchi | B01D 71/5211 210/96.2 |
| 2010/0261801 A1 | 10/2010 | Weiss et al. | |
| 2011/0244215 A1 | 10/2011 | Thom et al. | |

FOREIGN PATENT DOCUMENTS

| | | | |
|---|---|---|---|
| EP | 0750936 A1 | 1/1997 | |
| JP | 61-238834 A | 10/1986 | |
| JP | S64-034403 A | 2/1989 | |
| JP | H04-068966 B2 | 11/1992 | |
| JP | H04-349927 A | 12/1992 | |
| JP | H04-351645 A | 12/1992 | |
| JP | 2003-164788 A | 6/2003 | |
| JP | 2003-251162 A | 9/2003 | |
| JP | 2003-251163 A | 9/2003 | |
| JP | 2008-543546 A | 12/2008 | |
| JP | 2010-235808 A | 10/2010 | |
| JP | 2010253470 A * | 11/2010 | ........... B01D 69/084 |
| JP | 2011-508065 A | 3/2011 | |
| JP | 2012-045524 A | 3/2012 | |
| JP | 2012-515075 A | 7/2012 | |
| WO | 2005/037413 A1 | 4/2005 | |
| WO | 2016/114051 A1 | 7/2016 | |

OTHER PUBLICATIONS

Communication dated Mar. 3, 2023 issued by the State Intellectual Property Office of the P.R. China in Chinese application No. 201980076400.1.
International Search Report dated Mar. 3, 2020 in Application No. PCT/JP2019/046687.
Written Opinion of the International Searching Authority dated Mar. 3, 2020 in Application No. PCT/JP2019/046687.
International Preliminary Report on Patentability dated May 25, 2021 in Application No. PCT/JP2019/046687.
Office Action issued May 24, 2022 in Japanese Application No. 2020-557845.
Office Action dated Jun. 30, 2022 from The State Intellectual Property Office of People's Republic of China in Chinese Application No. 201980076400.1.

* cited by examiner

US 12,226,742 B2

METHOD FOR MANUFACTURING POROUS MEMBRANE AND POROUS MEMBRANE

CROSS-REFERENCE TO RELATED APPLICATIONS

This application is a continuation of PCT International Application No. PCT/JP2019/046687 filed on Nov. 29, 2019, which claims priority under 35 U.S.C § 119 (a) to Japanese Patent Application No. 2018-225127 filed on Nov. 30, 2018, the entire content of which is incorporated herein by reference.

BACKGROUND OF THE INVENTION

1. Field of the Invention

The present invention relates to a method for manufacturing a porous membrane and a porous membrane.

2. Description of the Related Art

A porous membrane including a polymer has been used as a filtration membrane for water, drinking water, or medicine, or as a filter cartridge.

JP1992-349927A (JP-H04-349927A) discloses that a microfiltration membrane is manufactured by a method including casting a stock solution for forming a membrane, which contains polysulfone as a water-insoluble resin and polyvinylpyrrolidone as a water-soluble resin, on a support. In the method disclosed in JP1992-349927A (JP-H04-349927A), it is possible to manufacture a microfiltration membrane having different pore diameters in a thickness direction, and for example, it is possible to produce a porous membrane having a compact layer with a small pore diameter inside.

JP2011-508065A discloses a method for producing a functionalized membrane, which includes applying at least graftable one to a porous substrate and treating the coated porous substrate by electron beam irradiation.

SUMMARY OF THE INVENTION

In the manufacture of filtration membranes or filter cartridges, washing and drying are generally performed to ensure cleanliness and water flow, and to reduce an elution amount of filtration membrane components. In addition, in the filter cartridge, an integrity test is carried out to confirm the presence or absence of defects such as a pinhole or a defective seal. In the integrity test, water is passed through the filtration membrane attached to a filter device to fill pores with water, and then pressure is applied to the filtration membrane to observe gas leakage.

In the manufacturing method disclosed in JP1992-349927A (JP-H04-349927A), hydrophilicity is imparted to the porous membrane by using a water-soluble resin. However, in a washing process in a case of manufacturing and processing the porous membrane as filtration membrane or a filter cartridge, the water-soluble resin may flow out to decrease the hydrophilicity, which makes it impossible to perform the integrity test. On the other hand, it is also conceivable to increase the hydrophilicity by adjusting the amount of the hydrophilic resin added in a case of manufacturing the porous membrane, but there is a concern that the amount of porous membrane components eluted during washing or water flowing increases.

In addition, JP2011-508065A discloses that the surface of the porous membrane is imparted with hydrophilicity by surface modification using a graftable one. However, it is considered that the water flow is decreased due to the surface modification, and the development of another method is desired.

An object of the present invention is to provide a method for manufacturing a porous membrane having high water permeability and hydrophilicity, which is not easily affected by a treatment such as washing.

In order to achieve the above-described objects, the present inventors have conducted studies, in particular, using a porous membrane hydrophilized with polyvinylpyrrolidone. As a result, it is found that, by irradiating the porous membrane with an electron beam at a relatively high intensity, hydrophilicity of the porous membrane is less likely to be reduced by washing, and based on this finding, the present invention is completed.

That is, the present invention provides the following <1> to <16>.

<1> A method for manufacturing a porous membrane, comprising:
preparing, as a substrate, a membrane having a plurality of pores, which includes a water-insoluble resin and a water-soluble resin including a monomer unit of polyvinylpyrrolidone or a monomer unit of polyvinyl alcohol; and
irradiating the substrate with an electron beam in the presence of an aqueous solvent to crosslink at least a part of the water-soluble resin.

<2> The manufacturing method according to <1>,
in which the water-insoluble resin includes at least one selected from the group consisting of polysulfone, polyethersulfone, polyphenylsulfone, polyarylate, polyimide, and polyvinylidene fluoride.

<3> The manufacturing method according to <2>,
in which the water-insoluble resin is polysulfone or polyethersulfone.

<4> The manufacturing method according to any one of <1> to <3>,
in which, in the electron beam irradiation, the substrate includes the aqueous solvent in an amount of 50% by mass to 500% by mass of a dry mass of the substrate.

<5> The manufacturing method according to any one of <1> to <4>,
in which the aqueous solvent is applied to the substrate by spray-coating or die-coating.

<6> The manufacturing method according to any one of <1> to <4>, further comprising:
applying the aqueous solvent to the substrate by immersing the substrate in the aqueous solvent, and after application of the aqueous solvent, removing excess aqueous solvent on a surface of the substrate.

<7> The manufacturing method according to any one of <1> to <6>,
in which a thickness of the substrate is 40 μm to 300 μm.

<8> The manufacturing method according to any one of <1> to <7>,
in which the electron beam irradiation is performed at an absorbed dose of 50 kGray to 300 kGray.

<9> The manufacturing method according to any one of <1> to <8>, further comprising:
in the preparation of the substrate, casting a solution including the water-insoluble resin and the water-soluble resin on a support to form the membrane having a plurality of pores on the support.

<10> The manufacturing method according to <9>,
in which the electron beam irradiation is performed from a surface side which is a side of the support in the preparation of the substrate.

<11> A porous membrane comprising:
a water-insoluble resin; and
a water-soluble resin including a monomer unit of polyvinylpyrrolidone or a monomer unit of polyvinyl alcohol,
in which an insoluble component in a case where 60 cm² of the porous membrane is immersed in 50 mL of methylene chloride for 24 hours is 0.5% by mass or more of a dry mass of the porous membrane before the immersion.

<12> The porous membrane according to <11>,
in which the water-insoluble resin includes at least one selected from the group consisting of polysulfone, polyethersulfone, polyphenylsulfone, polyarylate, polyimide, and polyvinylidene fluoride.

<13> The porous membrane according to <12>,
in which the water-insoluble resin is polysulfone or polyethersulfone.

<14> The porous membrane according to any one of <11> to <13>,
in which the water-soluble resin is included in an amount of 0.5% to 20% by mass of the dry mass of the porous membrane.

<15> The porous membrane according to any one of <11> to <14>,
in which the porous membrane has a layered compact portion with a minimum pore diameter inside the membrane.

<16> The porous membrane according to any one of <11> to <15>,
in which a thickness of the porous membrane is 40 μm to 300 μm.

According to the present invention, a method for manufacturing a porous membrane having high water permeability and hydrophilicity, which is not easily affected by a treatment such as washing is provided. According to the manufacturing method of an aspect of the present invention, it is possible to manufacture a porous membrane which has high water permeability and can pass an integrity test in a case of being used as a filtration membrane in a filter cartridge.

DESCRIPTION OF THE PREFERRED EMBODIMENTS

The method for manufacturing a porous membrane according to the embodiment of the present invention includes irradiating a substrate with an electron beam in the presence of an aqueous solvent. The substrate itself used in the method for manufacturing a porous membrane according to the embodiment of the present invention is also a porous membrane, and the method for manufacturing a porous membrane according to the embodiment of the present invention is also a method of imparting hydrophilicity to the porous membrane or a method of enhancing the hydrophilicity of the porous membrane.

Figure 1:
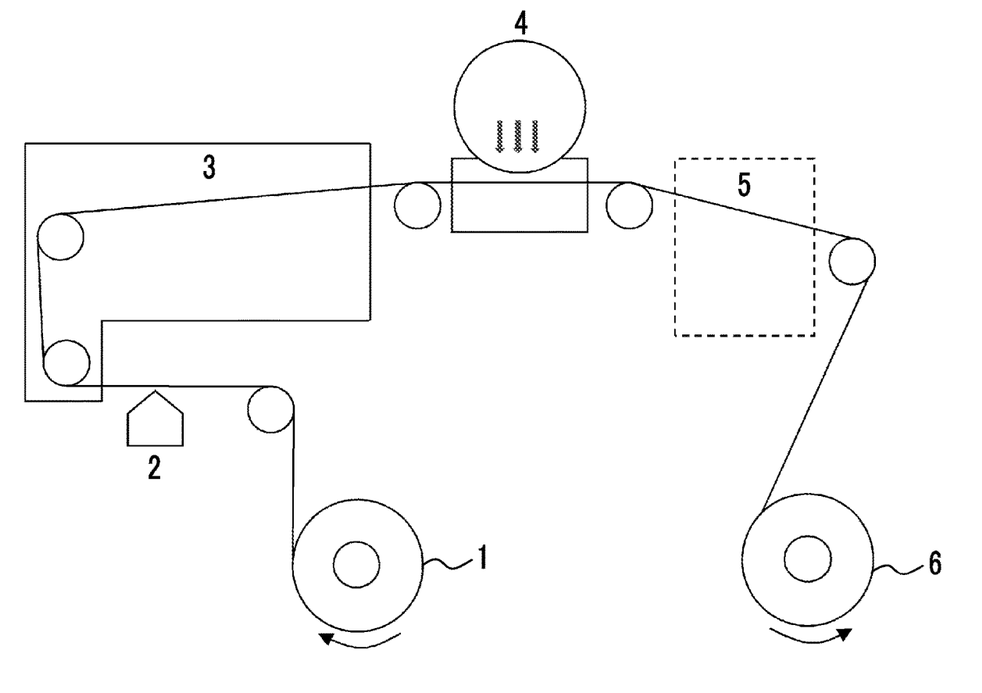
FIG. 1 is an example of a process diagram of the method for manufacturing a porous membrane according to the embodiment of the present invention.

FIG. 1 shows an example of a process diagram of the manufacturing method of the present invention. In the example shown in FIG. 1, a substrate is prepared in a roll shape and unwound (1). Thereafter, the substrate is applied with an aqueous solvent (2), the excess aqueous solvent is removed as needed (3), and then the substrate is irradiated with an electron beam (4). After undergoing an optional post-treatment process (5), the substrate is wound into a roll as needed (6). As shown in FIG. 1, the manufacturing method of the present invention is preferably carried out while continuously transporting the substrate. This is because the irradiation dose of the electron beam or the application amount of the aqueous solvent can be stable and uniform.

Hereinafter, details of each material and each process used in the manufacturing method of the present invention will be described.

In the present specification, "to" is used to refer to a meaning including numerical values denoted before and after "to" as a lower limit value and an upper limit value.

<Porous Membrane>

The porous membrane is a membrane having a plurality of pores. In the present specification, in a case where the term "porous membrane" is simply described, it means both a porous membrane as a substrate and a porous membrane obtained by the manufacturing method of the present invention. In the manufacturing method of the present invention, as the porous membrane, a porous membrane including a water-insoluble resin and a water-soluble resin including a monomer unit of polyvinylpyrrolidone or a monomer unit of polyvinyl alcohol is used.

[Water-Insoluble Resin]

The porous membrane includes a water-insoluble resin. It is preferable that the skeleton of the porous membrane is configured of the water-insoluble resin. A porous membrane formed of a water-insoluble resin generally has high water resistance, chemical resistance, and mechanical resistance, and is suitable for industrial use as a filter.

Examples of the water-insoluble resin include thermoplastic or thermosetting polymers. Specific examples of the polymer include polysulfone, polyethersulfone, polyphenylsulfone, polyarylate, sulfonated polysulfone, sulfonated polyethersulfone, cellulose acylate, nitrocellulose, polyacrylonitrile, styrene-acrylonitrile copolymer, styrene-butadiene copolymer, saponified ethylene-vinyl acetate copolymer, polyvinyl alcohol, polycarbonate, an organosiloxane-polycarbonate copolymer, a polyester carbonate, an organopolysiloxane, a polyphenylene oxide, a polyamide, a polyimide, polyamidoimide, polybenzimidazole, ethylene vinyl alcohol copolymer, polytetrafluoroethylene (PTFE), polyethylene, polypropylene, polyfluoroethylene, polyethylene terephthalate, 6,6-nylon, and polyvinylidene fluoride (PVDF). From the viewpoints of solubility, optical physical properties, electrical physical properties, strength, elasticity, and the like, the polymer may be a homopolymer, a copolymer, a polymer blend, or a polymer alloy.

Among these, polysulfone, polyethersulfone, polyphenylsulfone, polyarylate, polyimide, or polyvinylidene fluoride is preferable, and polysulfone or polyethersulfone is more preferable.

In particular, a polysulfone-based polymer selected from the group consisting of polysulfone, polyethersulfone, and polyphenylsulfone is preferable for manufacturing a porous membrane having a layered compact portion with a minimum pore diameter inside the membrane. The polysulfone is represented by Formula (I), the polyethersulfone is represented by Formula (II), and the polyphenylsulfone is represented by Formula (III).

The number average molecular weight (Mn) of the water-insoluble resin is preferably 1,000 to 10,000,000 and more preferably 5,000 to 1,000,000. Here, the number average molecular weight (Mn) of the water-insoluble resin is obtained by gel permeation chromatography (GPC).

[Water-Soluble Resin]

In addition to the water-insoluble resin, the porous membrane includes a water-soluble resin including a monomer unit (repeating unit structure) of polyvinylpyrrolidone (PVP) or a monomer unit (repeating unit structure) of polyvinyl alcohol (PVA).

By including the water-soluble resin, the hydrophilicity is imparted to the hydrophobic porous membrane skeleton formed of the water-insoluble resin. In the substrate, it is sufficient that the water-soluble resin is retained in the porous membrane skeleton. For example, it is sufficient that the water-soluble resin is present on a surface of the porous membrane skeleton configured of the water-insoluble resin, that is, on a pore surface of the porous membrane. Alternatively, the water-soluble resin may be partially incorporated into the porous membrane skeleton configured of the water-insoluble resin. According to the manufacturing method of the present invention, the hydrophilicity imparted by the water-soluble resin can be less likely to be lowered by a treatment such as washing. It is considered that this is because, by performing electron beam irradiation in the presence of an aqueous solvent in the manufacturing method of the present invention, the water-soluble resin retained in the porous membrane skeleton is crosslinked and less likely to separate from the porous membrane skeleton. The fact that the water-soluble resin is crosslinked can be estimated from that, as shown in Examples described later, in the porous membrane after electron beam irradiation, insoluble components are generated in a solvent which completely dissolves the porous membrane before electron beam irradiation. In the present specification, a case where the water-soluble resin is "insolubilized" means that insoluble components are generated in a solvent which completely dissolves the porous membrane before electron beam irradiation.

As the solvent which completely dissolves the porous membrane before electron beam irradiation, methylene chloride may be used. For example, in the porous membrane obtained by the manufacturing method of the present invention, an insoluble component in a case of being immersed in methylene chloride is 0.5% by mass or more of a dry mass of the porous membrane before immersion, preferably 0.8% by mass or more and more preferably 1.2% by mass or more. Specifically, the amount of the above-described insoluble component is obtained by sampling 60 cm$^2$ of the porous membrane, measuring the mass of the insoluble component generated after immersing the sample in 50 mL of methylene chloride for 24 hours, and determining the ratio of the insoluble component to the dry mass of the sampled porous membrane before immersion. The above-described immersion may be performed at room temperature (20° C.).

In the substrate, the water-soluble resin may be included in the porous membrane by being added to the porous membrane skeleton configured of the water-insoluble resin. For example, the water-soluble resin may be included in the porous membrane by applying the water-soluble resin or a solution containing the water-soluble resin to the porous membrane skeleton formed of the water-insoluble resin, or by immersing the porous membrane skeleton formed of the water-insoluble resin in the water-soluble resin or a solution containing the water-soluble resin.

Alternatively, the water-soluble resin may already be included in the porous membrane in the manufacturing process of the porous membrane skeleton formed of the water-insoluble resin. For example, polyvinylpyrrolidone is added as a pore-forming agent in the stock solution for forming a polysulfone membrane or a polyethersulfone membrane (for example, refer to JP1989-034403A (JP-S64-034403A)). Most of polyvinylpyrrolidone in the stock solution for forming a membrane is dissolved and removed in coagulation water during a process of forming a membrane. However, since a part of polyvinylpyrrolidone remains on the surface of the membrane, the obtained porous membrane includes polyvinylpyrrolidone, which is the water-soluble resin.

The water-soluble resin may include a monomer unit other than the monomer unit of polyvinylpyrrolidone or the monomer unit of polyvinyl alcohol, but is preferably a resin formed of the monomer unit of polyvinylpyrrolidone or the monomer unit of polyvinyl alcohol. That is, it is preferable that the structure of the water-soluble resin is a repeating structure of one or two monomer units selected from the group consisting of the monomer unit of polyvinylpyrrolidone and the monomer unit of polyvinyl alcohol. The water-soluble resin may have a repeating structure consisting of only the monomer unit of polyvinylpyrrolidone, a repeating structure consisting of only the monomer unit of polyvinyl alcohol, or a repeating structure including both monomer units. In a case where both are included, the water-soluble resin may be a random copolymer, an alternating copolymer, or a block copolymer. The water-soluble resin can be obtained by polymerizing one or two monomers selected from the group consisting of N-vinylpyrrolidone (NVP) and vinyl alcohol (VA). The water-soluble resin may be a polymer obtained by performing a polymerization reaction using vinyl acetate in place of the vinyl alcohol or a part of vinyl alcohol, and hydrolyzing the resultant. That is, the monomer unit of polyvinyl alcohol may be formed by hydrolyzing the monomer unit of polyvinyl acetate.

As the water-soluble resin, polyvinylpyrrolidone or polyvinyl alcohol is preferable.

The molecular weight of the water-soluble resin can be obtained by gel permeation chromatography (GPC). With regard to a polymer in which the molecular weight is difficult to obtain by GPC, for example, polyvinylpyrrolidone, the molecular weight can be obtained as a viscosity-average molecular weight obtained from a measured value of capillary viscosity. The molecular weight of the water-soluble resin is, as a weight-average molecular weight obtained by GPC, preferably 5000 to 2000000 and more preferably 10000 to 2000000.

In the porous membrane obtained by the manufacturing method of the present invention, the water-soluble resin is preferably included in an amount of 0.5% to 20% by mass of the dry mass of the porous membrane, more preferably included in an amount of 1.0% to 15% by mass, and still more preferably included in an amount of 2.0% to 10% by mass. Here, the water-soluble resin includes those which have been insolubilized by electron beam irradiation and those which have not been insolubilized by electron beam irradiation. In order to obtain a porous membrane having the above-described water-soluble resin content, it is sufficient that the substrate also includes the same amount of the water-soluble resin. Alternatively, in consideration of the amount which does not insolubilize even after electron beam irradiation and easily elutes from the porous membrane, the substrate may include a larger amount of the water-soluble resin than the above.

[Other Components Included in Porous Membrane]

The porous membrane may include other components as an additive, in addition to the water-insoluble resin and the water-soluble resin.

Examples of the additive include metal salts of inorganic acid such as sodium chloride, lithium chloride, sodium nitrate, potassium nitrate, sodium sulfate, and zinc chloride; metal salts of organic acid such as sodium acetate and sodium formate; polymers such as polyethylene glycol and polyvinylpyrrolidone; polymer electrolytes such as sodium polystyrene sulfonate and polyvinyl benzyl trimethyl ammonium chloride; and ionic surfactants such as sodium dioctyl sulfosuccinate and sodium alkylmethyltauratetaurate. The additive may act as a swelling agent for a porous structure.

[Structure of Porous Membrane]

The porous membrane refers to a membrane having a plurality of pores. The pores can be confirmed by, for example, captured images of a scanning electron microscope (SEM) or captured images of a transmission electron microscope (TEM) of a cross section of the membrane.

The pore diameter of the pores in the porous membrane can be appropriately selected depending on the size of a filtration object, and may be 0.005 μm to 25 μm and more preferably 0.01 μm to 20 μm. In a case of having pore diameter distribution, it is sufficient that the pores are distributed within the range. A pore diameter may be measured from an image of a cross section of the membrane obtained by an electron microscope. The porous membrane can be cut with a microtome or the like, and it is possible to obtain an image of the cross section of the porous membrane as a section of a thin membrane in which a cross section can be observed.

The pore diameter of pores of the porous membrane obtained by the manufacturing method of the present invention may be smaller than the pore diameter of the porous membrane as the substrate by a treatment, but usually, it can be approximated to be the same as the pore diameter of the substrate.

The porous membrane may have a structure having a pore diameter distribution in a thickness direction, or may have a homogeneous structure not having pore diameter distribution in the thickness direction. In addition, the structure having a pore diameter distribution in the thickness direction may be a structure (asymmetric structure) which is asymmetric in the thickness direction with a pore diameter distribution such that the pore diameter of a front surface of the membrane and the pore diameter of a back surface of the membrane are different. Examples of the asymmetric structure include a structure in which the pore diameter continuously increases from one surface of the membrane toward another surface of the membrane in the thickness direction, and a structure in which a layered compact portion with a minimum pore diameter is provided at an inside, and the pore diameter continuously increases in a thickness direction from the compact portion toward at least one membrane surface of the porous membrane.

In particular, it is preferable that the porous membrane has a structure in which a layered compact portion with a minimum pore diameter is provided inside the membrane, and the pore diameter continuously increases in a thickness direction from the compact portion toward at least one membrane surface of the porous membrane.

In the present specification, in a case of comparing pore diameters in the thickness direction of the membrane, the comparison is performed by dividing the SEM image of the cross section of the membrane in the thickness direction of the membrane. The number of divisions can be appropriately selected according to the thickness of the membrane. The number of divisions is at least 5 or more, and for example, in a membrane having a thickness of 200 μm, 19 parting lines for divide the surface X described later into 20 parts are drawn, pores (closed pores) crossing or in contact with each parting line are traced with a digitizer, and an average pore diameter of 50 consecutive pores is used to obtain the number of divisions. The size of the division width means the size of the width in the thickness direction of the membrane, and does not mean the size of the width in the image. In the comparison of the pore diameters in the thickness direction of the membrane, the pore diameters are compared by the average pore diameter of each section. It is sufficient that the average pore diameter of each section is, for example, an average value of 50 pores in each section of the membrane cross-sectional view. The membrane cross-sectional view in this case may be obtained, for example, with a width of 80 μm (distance of 80 μm in a direction parallel to the surface). In this case, in a section in which the pores are large and 50 pores cannot be measured, it is sufficient that the average value is obtained by measuring the number of holes which can be taken in the section. In addition, in this case, in a case where pores are too large to fit in the section, the size of the pores is measured over other sections.

The layered compact portion with a minimum pore diameter refers to a layered portion of the porous membrane corresponding to a section having the minimum average pore diameter among the sections of the cross section of the membrane. The compact portion may consist of a portion corresponding to one section, or may consist of a portion corresponding to a plurality of sections, such as two sections and three sections, having an average pore diameter within 1.1 times the section having the minimum average pore diameter. It is sufficient that a thickness of the compact portion is 0.5 μm to 50 μm, preferably 0.5 μm to 30 μm. In the present specification, an average pore diameter of the compact portion refers to the minimum pore diameter of the porous membrane. The minimum pore diameter of the porous membrane is preferably 0.005 μm or more and more preferably 0.01 μm or more, and preferably 10 μm or less and more preferably 5 μm or less. The reason is that the minimum pore diameter of such a porous membrane can inhibit permeation of at least normal cells. Here, the average pore diameter of the compact portion is measured by ASTM F316-80.

The porous membrane preferably has the compact portion within the inside. The "inside" means that the compact portion is not in contact with the surface of the membrane. The phrase "having the compact portion within the inside" means that the compact portion is not the closest section to any surface of the membrane. By using the porous membrane having a structure having the compact portion within the inside, permeability of substances intended to permeate is unlikely to lower compared to a case of using a porous membrane having the same compact portion which is in contact with the surface thereof. Although not bound by any theory, it is considered that the substances (proteins and the like) are hardly adsorbed due to the presence of the compact portion within the inside.

It is preferable that the compact portion is biased to one of the front surface sides from a central portion in the thickness of the porous membrane. Specifically, the compact portion is preferably located between any one surface of the porous membrane and a portion at a distance of one-third of the thickness of the porous membrane from the surface, more preferably located between any one surface of the porous membrane and a portion at a distance of two-fifths of the thickness of the porous membrane from the surface, and even more preferably located between any one surface of the porous membrane and a portion at a distance of a quarter of the thickness of the porous membrane from the surface. It is sufficient that the distance is determined from the image of the cross section of the membrane described above. In the present specification, the surface of the porous membrane closer to the compact portion is referred to as a "surface X."

In the porous membrane, it is preferable that a pore diameter continuously increases in the thickness direction from the compact portion toward at least one of the surfaces. In the porous membrane, the pore diameter may continuously increase in the thickness direction toward the surface X from the compact portion, the pore diameter may continuously increase in the thickness direction toward the surface opposite to the surface X from the compact portion, and the pore diameter may continuously increase in the thickness direction toward any surface of the porous membrane from the compact portion. Among these, it is preferable that the pore diameter continuously increases in the thickness direction toward at least the surface opposite to the surface X from the compact portion, and it is more preferable that the pore diameter continuously increases in the thickness direction toward any surface of the porous membrane from the compact portion. The phrase "the pore diameter continuously increases in the thickness direction" means that a difference in average pore diameters between the sections adjacent to each other in the thickness direction increases by 50% or less of a difference between maximum average pore diameters (maximum pore diameters) and minimum average pore diameters (minimum pore diameters), preferably increases by 40% or less and more preferably increases by 30% or less. The phrase "continuously increasing" essentially means that a pore diameter increases uniformly without decreasing, but a decreasing portion may occur accidentally. For example, in a case of combining two sections from the surface, in a case where an average value of a combination increases uniformly (uniformly decreases toward the compact portion from the surface), it can be determined that "the pore diameter continuously increases in the thickness direction toward the surface of the membrane from the compact portion".

The maximum pore diameter of the porous membrane is preferably more than 0.1 µm, more preferably 1.0 µm or more, and even more preferably more than 1.5 µm, and preferably 25 µm or less, more preferably 23 µm or less, and even more preferably 21 µm or less. In the present specification, an average pore diameter of the section having the maximum average pore diameter among the sections of the cross section of the membrane is referred to as the maximum pore diameter of the porous membrane.

A ratio of the average pore diameter of the compact portion to the maximum pore diameter of the porous membrane (ratio of the minimum pore diameter to the maximum pore diameter of the porous membrane, which is a value obtained by dividing the maximum pore diameter by the minimum pore diameter, also referred to as an "anisotropy ratio" in the present specification) is preferably 3 or more, is more preferably 4 or more, and is even more preferably 5 or more. The reason is that an average pore diameter except for that of the compact portion increases so that substance permeability of the porous membrane increases. In addition, the anisotropy ratio is preferably 25 or less, and more preferably 20 or less. The reason is that effects, as though multistage filtration would be carried out, can be efficiently obtained within a range in which an anisotropy ratio is 25 or less.

It is preferable that a section with a maximum average pore diameter is a section closest to any surface of the membrane or a section in contact with the section with a maximum average pore diameter.

In the section closest to any surface of the membrane, it is preferable that an average pore diameter is more than 0.05 µm and 25 µm or less, more preferably more than 0.08 µm and 23 µm or less, and even more preferably more than 0.1 µm and 21 µm or less. In addition, a ratio of the average pore diameter of the compact portion to the average pore diameter of the section closest to any surface of the membrane is preferably 1.2 to 20, is more preferably 1.5 to 15, and is even more preferably 2 to 13.

The thickness of the porous membrane is not particularly limited, but from the viewpoint of membrane hardness, handleability, and filtration performance, is preferably 10 µm to 1000 µm and more preferably 10 µm to 500 µm.

Furthermore, in consideration of the electron beam irradiation process in the manufacturing method of the present invention, the thickness of the porous membrane is preferably 40 µm to 300 µm. By setting the thickness to be 40 µm or more, it is possible to prevent the occurrence of wrinkles due to the influence of electron beam irradiation, and by setting the thickness to be 300 µm or less, it is possible to promote the insolubilization of water-soluble resin existing on the surface side opposite to the surface on the electron beam irradiation side, and to enhance the hydrophilicity of the porous membrane in the entire thickness direction.

The porous membrane is preferably a membrane formed from a single composition as a single layer, and preferably does not have a laminated structure of a plurality of layers.

However, the porous membrane may have a support which does not have a porous structure, in order to facilitate transportation in the manufacturing method of the present invention. As the support, the one used as the support in the manufacture of the substrate described later can be used as it is.

The porous membrane is preferably elongated. This is because the manufacturing method of the present invention facilitates transportation. The size of the elongated porous membrane is preferably 100 mm to 1650 mm in width and 50 m to 4000 m in length. This is because the size is suitable for continuous treating by uniformly irradiating the entire width with an electron beam irradiation device.

<Method for Manufacturing Porous Membrane>

[Preparation of Substrate]

The substrate may be prepared as a film having a fixed area, but is preferably prepared as a long film in a rolled state.

As the substrate, a commercially available porous membrane may be used, or may be manufactured by a known method.

Examples of the commercially available porous membrane include Sumilite FS-1300 (manufactured by Sumitomo Bakelite Co., Ltd.), MicroPES 1FPH (manufactured by Membrana), PSEUH20 (polysulfone membrane, manufactured by FUJIFILM Corporation), Durapore (PVDF membrane, manufactured by Merck Millipore), 15406 (PES membrane, manufactured by Sartorius), and MS (registered trademark) hydrophobic PVDF membrane and hydrophilic PVDF membrane (PVDF membrane, manufactured by Membrane Solutions Limited).

A method for manufacturing the substrate is not particularly limited as long as the method can form the porous membrane having the above-described structure, and any general methods for forming a polymer membrane can be used. Examples of methods for forming a polymer membrane include a stretching method, a flow-casting method, and the like, and a flow-casting method is preferable.

In the flow-casting method, it is possible to produce a porous membrane having the above-described structure (pore diameter distribution) by adjusting the type and amount of a solvent used in a stock solution for forming a membrane, or a drying method after flow-casting.

Manufacture of a porous membrane using the flow-casting method can be carried out by a method including, for example, the following (1) to (4) in this order.

(1) A stock solution for forming a membrane, which contains a polymer, if necessary an additive, and if necessary a solvent, is cast on a support while being in a dissolved state.
(2) The surface of the cast liquid membrane is exposed to temperature-controlled humid air.
(3) The membrane obtained after being exposed to temperature-controlled humid air is immersed in a coagulation liquid.
(4) A support is peeled off if necessary.

It is sufficient that a temperature of temperature-controlled humid air is 4° C. to 60° C., preferably 10° C. to 40° C. It is sufficient that a relative humidity of the temperature-controlled humid air is 15% to 100%, preferably 25% to 95%. It is sufficient that the temperature-controlled humid air is applied at a wind speed of 0.1 m/s to 10 m/s for 0.3 seconds to 30 seconds, preferably 1 second to 10 seconds.

The distribution and amount of the water-soluble resin in the porous membrane can be controlled by the thickness of the porous membrane, the pore diameter of the porous membrane, the pore diameter of the compact portion, the thickness of the compact portion, the position of the compact portion, the temperature of diethylene glycol during washing described later, the speed of the substrate manufacturing line, and the like. For example, in a case where the water-soluble resin is added in the manufacturing process of the porous membrane skeleton formed of the water-insoluble resin and a part thereof remains, a large amount of water-soluble resin remains in a case where the porous membrane is thick of the pore diameter of the porous membrane is small. In addition, the amount of water-soluble resin in a central portion of the porous membrane in the thickness direction increases. In addition, in a case where the substrate has a compact portion, and the water-soluble resin is added in the manufacturing process of the porous membrane skeleton formed of the water-insoluble resin and a part thereof remains, a large amount of water-soluble resin remains as the pore diameter of the compact portion is smaller or the compact portion is thicker. In addition, in a case where the compact portion is located in the central portion of the substrate, a large amount of water-soluble resin remains in that portion. The amount of the water-soluble resin in the porous membrane can be adjusted by changing conditions depending on the thickness and pore diameter of the porous membrane, for example, in a case of washing with diethylene glycol or the like described later.

The pore diameter of the porous membrane and the pore diameter, thickness, or position of the compact portion can be controlled by a moisture concentration contained in the temperature-controlled humid air, a time of applying the temperature-controlled humid air, a temperature of the coagulation liquid, and an immersion time. In addition, the formation of the compact portion and the average pore diameter and position of the formed compact portion can also be controlled by the moisture concentration contained in the temperature-controlled humid air and the time of applying the temperature-controlled humid air. The average pore diameter of the compact portion can also be controlled by an amount of moisture contained in a stock solution for forming a membrane.

By applying the temperature-controlled humid air to the surface of the liquid membrane as described above, it is possible to cause coacervation from the surface of the liquid membrane toward the inside of the membrane by controlling evaporation of a solvent. By immersing the liquid membrane on the support in a coagulation liquid containing a solvent which has low solubility of the polymer and is compatible with the solvent of the polymer in this state, the above-mentioned coacervation phase is fixed as fine pores, and pores other than the fine pores can also be formed.

It is sufficient that a temperature of the coagulation liquid in a process of immersing the membrane in the coagulation liquid is −10° C. to 80° C. By changing temperature during this period, it is possible to control a size of a pore diameter up to a support surface side by adjusting time from the formation of the coacervation phase to the coagulation from the compact portion toward the support surface side. In a case where a temperature of the coagulation liquid is raised, the formation of the coacervation phase becomes faster and a time for coagulation becomes longer, therefore the pore diameter toward the support surface side tends to become large. On the other hand, in a case where a temperature of the coagulation liquid is lowered, the formation of the coacervation phase becomes slower and a time for coagulation becomes shorter, therefore the pore diameter toward the support surface side is unlikely to become large.

As the support, a plastic film or a glass plate may be used. Examples of materials of the plastic film include polyester such as polyethylene terephthalate (PET), polycarbonate, acrylic resin, epoxy resin, polyurethane, polyamide, polyolefin, a cellulose derivative, and silicone. As the support, a glass plate or PET is preferable, and PET is more preferable.

In a case where the substrate is prepared as a long film wound in a roll together with the support, it is preferable to use a plastic film as the support.

The stock solution for forming a membrane may contain a solvent. A solvent having high solubility of the polymer to be used (hereinafter referred to as a "favorable solvent") may be used depending on the polymer to be used. As the solvent, a solvent which is quickly substituted with the coagulation liquid in a case where the membrane is immersed in the coagulation liquid is preferable. Examples of solvents include, in a case where the polymer is polysulfone or the like, N-methyl-2-pyrrolidone, dioxane, tetrahydrofuran, dimethylformamide, dimethylacetamide, and a mixed solvent thereof; in a case where the polymer is polyacrylonitrile or the like, dioxane, N-methyl-2-pyrrolidone, dimethylformamide, dimethylacetamide, dimethylsulfoxide, and a mixed solvent thereof; in a case where the polymer is polyamide or the like, dimethylformamide, dimethylacetamide, or a mixed solvent thereof; and in a case where the polymer is cellulose acetate or the like, acetone, dioxane, tetrahydrofuran, N-methyl-2-pyrrolidone, and a mixed solvent thereof. Among these, N-methyl-2-pyrrolidone is preferably used.

In addition to the favorable solvent, the stock solution for forming a membrane preferably uses a solvent (hereinafter referred to as a "non-solvent") in which the solubility of the polymer is low but which is compatible with a polymer solvent. Examples of the non-solvent include water, cellosolves, methanol, ethanol, 1-propanol, acetone, tetrahydrofuran, polyethylene glycol, and glycerin. Among these, water is preferably used.

As the stock solution for forming a membrane, a stock solution for forming a membrane, which is prepared by dissolving polysulfone and polyvinylpyrrolidone in N-methyl-2-pyrrolidone adding water thereto, is preferable.

It is sufficient that a concentration of the polymer as the stock solution for forming a membrane is 5% by mass to 35% by mass, preferably 10% by mass to 30% by mass. By setting the concentration thereof to 35% by mass or less, sufficient permeability (for example, water permeability) can be imparted to the obtained porous membrane. By setting the concentration thereof to 5% by mass or more, the formation of a porous membrane which selectively allows substances to permeate can be secured. An amount of additive to be added is not particularly limited as long as the uniformity of the stock solution for forming a membrane is not lost by the addition, but is generally 0.5% by mass to 10% by mass with respect to the solvent. In a case where the stock solution for forming a membrane contains a non-solvent and a favorable solvent, a proportion of the non-solvent to the favorable solvent is not particularly limited as long as a mixed solution can be maintained in a uniform state, but is preferably 0.2% by mass to 50% by mass, is more preferably 0.4% by mass to 30% by mass, and is even more preferably 0.7% by mass to 10% by mass. In addition, the content of the non-solvent is preferably 0.2% by mass to 10% by mass with respect to the stock solution for forming a membrane.

In addition, in the stock solution for forming a membrane for manufacturing a porous membrane containing a polymer selected from the group consisting of polysulfone and polyethersulfone, and containing polyvinylpyrrolidone, polyvinylpyrrolidone is preferably contained by an amount of 50% by mass to 120% by mass, and more preferably by an amount of 80% by mass to 110% by mass, with respect to a total mass of polysulfone and polyethersulfone. By using such a stock solution for forming a membrane, a porous membrane including polyvinylpyrrolidone in an amount of approximately 0.05% to 8.0% by mass is obtained. The amount of polyvinylpyrrolidone is reduced since polyvinylpyrrolidone is largely removed in a washing process.

Furthermore, in a case where the stock solution for forming a membrane contains lithium chloride as an additive, lithium chloride is preferably contained in an amount of 0.5% by mass to 20% by mass, and more preferably by 1% by mass to 15% by mass with respect to the total mass of polysulfone and polyethersulfone.

As the coagulation liquid, it is preferable to use a solvent having low solubility of the polymer used. Examples of such solvents include water; alcohols such as methanol, ethanol, and butanol; glycols such as ethylene glycol and diethylene glycol; aliphatic hydrocarbons such as ether, n-hexane, and n-heptane; and glycerols such as glycerin. Examples of preferred coagulation liquids include water, alcohols, and a mixture of two or more of these. Among these, water is preferably used.

After immersion in the coagulation liquid, it is also preferable to perform washing with a solvent different from the coagulation liquid which has been used. Washing can be carried out by immersing in a solvent. Examples of the washing solvent include water, alcohols, and a mixture of two or more of these, and diethylene glycol is particularly preferable. In particular, in a case of using polyvinylpyrrolidone to the stock solution for forming a porous membrane, the remaining amount of polyvinylpyrrolidone in the membrane can be controlled by using diethylene glycol as a washing solvent and adjusting either or both of a temperature and an immersion time of diethylene glycol which is immersed in a film. After washing with diethylene glycol, the membrane may be further washed with water.

Regarding other methods for manufacturing the porous membrane used as the substrate in the manufacturing method of the present invention, reference can be made to JP1992-349927A (JP-H04-349927A), JP1992-068966B (JP-H04-068966B), JP1992-351645A (JP-H04-351645A) JP2010-235808A, and the like.

The substrate may be prepared in a dry state. The drying can be performed in the same manner as in the drying as a post-treatment described later. Alternatively, the substrate may be prepared in the presence of an aqueous solvent. For example, the substrate may be prepared in a state where the aqueous solvent has permeated inside. For example, the above-described water used as the coagulation liquid, water used for washing (such as water in a case of washing with diethylene glycol and then further washing with water), and the like can be the aqueous solvent.

[Aqueous Solvent]

In the manufacturing method of the present invention, the substrate is irradiated with an electron beam in the presence of an aqueous solvent. Crosslinking of the water-soluble resin is promoted by irradiating with an electron beam in a state where molecules are easily moved in the aqueous solvent. By promoting the crosslinking, wettability of the porous membrane is maintained or improved, and the wettability can be maintained even after the post-treatment of the porous membrane described later. Due to the presence of the aqueous solvent, with regard to the water-soluble resin existing on the surface of the porous membrane skeleton formed of the water-insoluble resin and with regard to the water-soluble resin which is incorporated into the skeleton of the water-insoluble resin, the molecules can be easily moved. In addition, the presence of the aqueous solvent can prevent the porous membrane skeleton of the substrate from being modified or damaged due to the electron beam irradiation. It is preferable that the aqueous solvent is present in a state where the aqueous solvent has permeated inside the porous membrane which is the substrate. More specifically, it is preferable that the aqueous solvent is present in a state of being communicated with substantially all the pores existing between at least one surface of the substrate and the inside of the substrate, and it is preferable that the aqueous solvent is present in a state of being communicated with substantially all the pores existing between both surfaces of the substrate. Whether or not the aqueous solvent communicates with the surface of the substrate inside can be determined from the uniformity of wetting on the surface of the substrate, that is, the presence or absence of unevenness. In a case of being uniform, it can be estimated that they are communicated with each other.

The aqueous solvent is a solvent containing at least water. It is sufficient that the aqueous solvent is water or a solvent containing water and a water-miscible solvent. Examples of the water-miscible solvent include alcohols (methanol, ethanol, 1-propanol, 2-butanol, 1-butanol, ethylene glycol, diethylene glycol, glycerin, and the like) and acetic acid. The aqueous solvent contains water preferably in an amount of 70% by mass or more, more preferably in an amount of 90% by mass or more, still more preferably in an amount of 95% by mass or more, and particularly preferably in an amount of 98% by mass or more. It is most preferable that the aqueous solvent is water.

In order to sufficiently permeate the aqueous solvent inside the porous membrane which is the substrate, the substrate may be subjected to electron beam irradiation after applying the aqueous solvent. Examples of the method for applying the aqueous solvent include an immersion method, a spray-coating method, and a die-coating method. Among these, a spray-coating method or a die-coating method is preferable. This is because it is easy to adjust the amount of the aqueous solvent to be applied. In addition, this is because, by applying the aqueous solvent from one side by these methods, the aqueous solvent can be infiltrated in the thickness direction with a uniform distribution at each distance from the one side. Furthermore, in a case where the aqueous solvent is infiltrated into the porous membrane from both sides, air existing in the pores inside the porous membrane in the thickness direction may remain without being released. However, by infiltrating the aqueous solvent from one side in this way, it is possible to avoid a state in which the air is not released from the pores inside the porous membrane and the permeation of the aqueous solvent into the entire porous membrane is hindered. As the die-coating method, various dies such as the extrusion type die described in JP2003-164788A and a commercially available die can be used.

In a case where the aqueous solvent is applied from either side of the substrate by the spray-coating method or the die-coating method, and a case where the aqueous solvent is applied to the porous membrane which has the compact portion inside and in which the compact portion is biased toward the front surface side of either one of the thickness of the porous membrane from the central portion, the application may be performed from the surface X closer to the compact portion, or from the opposite side thereto, but is preferably performed from the opposite side. As will be described later, the opposite side is usually a side which has a large pore diameter and is desirable to be easier to wet in a case of being used as a filtration membrane, and it is preferable to perform electron beam irradiation from the opposite side. Therefore, during electron beam irradiation, it is preferable to allow the aqueous solvent to communicate at least in pores between the opposite surface and the compact portion. In addition, the aqueous solvent easily reaches the compact portion from the side having a large pore diameter.

In addition, in a case where the aqueous solvent is applied from either side of the substrate by the spray-coating method or the die-coating method, and a case where the aqueous solvent is applied to the porous membrane formed on the support which will be peeled off later, the application may be performed from the surface which is on a side of the support, or from the opposite side thereto, but is preferably performed from the surface which is on a side of the support. As will be described later, the surface which is on the side of the support is usually a side which has a large pore diameter and is desirable to be easier to wet in a case of being used as a filtration membrane, and it is preferable to perform electron beam irradiation from the surface. Therefore, during electron beam irradiation, it is preferable to allow the aqueous solvent to communicate at least between the surface side, which is the side of the support, and the inside of the substrate.

In a case where the substrate includes an excess of aqueous solvent, a part of the aqueous solvent may be removed prior to electron beam irradiation. It is possible to prevent problems caused by the substrate including the aqueous solvent more than necessary. In a case where the substrate includes a large amount of the aqueous solvent, for example, it is considered that there are problems that the substrate is wrinkled during transportation on the manufacturing line, that the substrate is slackened by the weight of the aqueous solvent, and that the roller for transportation is slipped. In addition, in a case where the substrate includes an excess of aqueous solvent, for example, it is considered that the amount of the aqueous solvent included in the porous membrane is uneven due to partial removal of excess water on the roller during transportation on the manufacturing line, resulting in uneven wetting uniformity.

It is sufficient that the aqueous solvent is removed from the surface of the substrate. Examples of the method for removing the aqueous solvent include drying, air knife, and squeeze.

The drying is a method of evaporating the aqueous solvent from the surface of the substrate by heating, air, or both. The air knife is a method of blowing gas on the surface to remove the aqueous solvent on the surface. For example, the aqueous solvent can be removed by ejecting gas in the direction (width direction) perpendicular to the traveling direction of the long-film-shaped substrate and forming an air curtain having a length substantially the same as the width. The gas used for the air knife may be any gas which does not affect subsequent treatment of the substrate using electron beam irradiation, and for example, air can be used. The squeeze is a method of removing the aqueous solvent on the surface by wrapping a cloth or the like around the roller during transportation, or passing the substrate between rollers wrapped with a cloth or the like. By wrapping the cloth around the roller, the cloth includes an excess of aqueous solvent on the surface of the porous membrane, and the excess aqueous solvent on the surface can be removed by moving the aqueous solvent to the outside of the portion where the porous membrane is transported. By wrapping the cloth around the roller, the holding power of the roller can be increased.

As the method for removing the aqueous solvent, the air knife or the squeeze is preferable. This is because it is easier to uniformly remove the aqueous solvent in the width direction and the longitudinal direction of the substrate than to dry with heating and/or wind.

The removal of the aqueous solvent is particularly preferably performed in combination with the application of the aqueous solvent using the immersion method. This is because, depending on the immersion method, the substrate tends to include the aqueous solvent more than necessary, and it is preferable that the excess aqueous solvent is removed after applying the aqueous solvent by immersion.

The amount of the aqueous solvent included in an electron beam irradiation portion of the substrate during electron beam irradiation is 50% by mass to 500% by mass, preferably 70% by mass to 450% by mass, and more preferably 100% by mass to 400% by mass of the dry mass of the portion of the substrate. The above-described amount can be adjusted by a method of applying the aqueous solvent to the substrate and a method of removing the aqueous solvent if necessary.

[Electron Beam Irradiation]

The present inventors have found that the hydrophilicity of the substrate can be easily maintained by irradiating the substrate including the aqueous solvent with an electron beam. It is considered that, by treating the water-soluble resin included in the substrate with an electron beam while including water in the aqueous solvent, the water-soluble resin included in the substrate is crosslinked at the surface of the porous membrane skeleton configured of the water-insoluble resin and the mixed portion with the water-insoluble resin, which makes the water-soluble resin difficult to separate from the porous membrane skeleton. In the crosslinking, it is estimated from the fact that the water-soluble resin has a structural portion of PVP or PVA and has a crosslinkable structure, and as shown in Examples described later, the water-soluble resin has an insoluble component in the porous membrane subjected to electron beam irradiation. That is, in the manufacturing method of the present invention, electron beam irradiation is performed so that at least a part of the water-soluble resin in the substrate is crosslinked.

In the electron beam irradiation, an electron beam is used. In the electron beam irradiation, electrons are artificially accelerated and irradiated to the object to be treated as a beam. Utilizing the high energy and permeability of the electron beam, not only the surface of the porous membrane but also the water-soluble resin existing inside can be insolubilized. Since the electron beam can reach the inside of the porous membrane and act, crosslinking inside the porous membrane is also promoted, and the elution amount after washing based on the post-treatment described later can be reduced. The electron beam is a type of radiation, and unlike radiation generated from an isotope, the electron beam can be electrically controlled and can be turned on and off instantly. A strong electron beam has an advantage that it is easier to control than other energies such as heat ray treatment. In the electron beam irradiation, the high energy of the electrons and the amount of energy required by the object to be irradiated can be easily controlled, so that the absorbed dose (energy received by the substance to be irradiated) can be controlled. In addition, the electron beam irradiation can impart uniform energy to a flat surface.

A general electron beam irradiation device may be used for the electron beam irradiation. A general electron beam irradiation device mainly consists of an irradiation unit, a power supply unit, and a control unit. The irradiation unit is a part which generates an electron beam, and the thermoelectrons generated in a filament in a vacuum chamber are drawn out by a grid, and further, the electrons can be accelerated by the high voltage (70 to 300 kV) loaded between the irradiation unit and a window. In the irradiation unit, a scanning method, a double scanning method, or a curtain beam method can be adopted, and preferably, a curtain beam method which can obtain a large output at a relatively low cost may be adopted.

It is preferable that X-rays generated secondarily are safely shielded by a self-shielding structure and the safety is ensured so as not to affect the working environment. A high-voltage power supply for acceleration, a filament power supply, and the like are housed in the power supply unit, and a control system, various monitors, and the like are housed in the control unit, which can be suitably used.

The electron beam irradiation is performed with such an intensity that at least a part of the water-soluble resin in the substrate is crosslinked. For example, the electron beam irradiation is performed at an absorbed dose, as the absorbed dose of the substrate, of preferably 50 to 300 kGy, more preferably 80 to 280 kGy, and still more preferably 100 to 230 kGy.

The acceleration voltage may be adjusted, for example, in a range of 70 to 150 kV so that the absorbed dose is within the above-described range. In addition, since electron beam permeability to the porous membrane changes depending on the acceleration voltage, it is also possible to adjust the wettability of the irradiated surface and the non-irradiated surface of the porous membrane and the crosslinkability of the water-soluble resin by adjusting the acceleration voltage. In addition, the acceleration voltage may be adjusted depending on the material and thickness of the porous membrane, the electron beam permeability, the crosslinkability of the water-soluble resin, the state of wrinkles generated during the electron beam irradiation treatment, and the like.

In a case where the electron beam irradiation is performed on the porous membrane which has the compact portion inside and in which the compact portion is biased toward the front surface side of either one of the thickness of the porous membrane from the central portion, the electron beam irradiation may be performed from the surface X side closer to the compact portion, or from the opposite side thereto, but is preferably performed from the opposite side. The reason is as follows. In a case where the porous membrane is used as a filtration membrane, water is generally passed through the opposite surface (secondary side) with the surface having a larger pore diameter as the primary side to which the stock solution is applied. Therefore, the higher hydrophilicity of the surface having a larger pore diameter makes it easier to wet the filtration membrane with the stock solution. Normally, the surface farther from the compact portion (opposite side of the surface X) is the surface with a larger pore diameter. Therefore, since this surface side is irradiated with an electron beam to insolubilize the water-soluble resin and enhance hydrophilicity, a porous membrane which is easy to use as a filtration membrane can be obtained.

In a case where the electron beam irradiation is performed on the porous membrane formed on the support, the electron beam irradiation may be performed from the side of the support, or from the opposite side thereto, but is preferably performed from the side of the support. In addition, in a case where the electron beam irradiation is performed on the porous membrane formed on the support which will be peeled off later, the electron beam irradiation may be performed from the surface which is on the side of the support, or from the opposite side thereto, but is preferably performed from the surface which is on the side of the support. For example, in the porous membrane produced as described above using polysulfone as the water-insoluble resin, this is because the surface on the side of the support is usually a surface having a larger pore diameter.

[Post-Treatment]

The porous membrane obtained after electron beam irradiation can be subjected to necessary post-treatment depending on the application.

Examples of the post-treatment include washing, drying, and sterilization treatment. The post-treatment such as washing may usually be performed on the same manufacturing line after electron beam irradiation, but may be performed on a porous membrane in a state of being processed into a filter cartridge or the like.

By washing, the water-soluble resin which is not sufficiently retained (for example, all or a part of the water-soluble resin which has not been insolubilized) and other unnecessary components can be removed from the obtained porous membrane. The washing method is not particularly limited, and it is sufficient that the washing solvent is permeated into the membrane surface and pore surface of the porous membrane by immersion or pressure method, and then removed. Examples of the washing solvent include water, alcohols such as methanol, ethanol, 1-propanol, and 2-propanol, ketones such as acetone, methyl ethyl ketone, and methyl isobutyl ketone, ethers such as tetrahydrofuran and dioxane, ethyl acetate, chloroform, and a mixed solvent of any two or more of these. As the washing solvent, water or a mixed solvent of water and a polar organic solvent is preferable. In the mixed solvent of water and a polar organic solvent, the amount of the polar organic solvent is preferably 10% to 60% by mass, more preferably 20% to 55% by mass, and still more preferably 30% to 50% by mass with respect to the total mass of the mixed solvent. The permeation and removal of the washing solvent may be performed twice or more. In this case, in the two or more washings, the washing solvents for each washing may be the same as or different from each other, by are preferably different from each other. It is preferable that the washing solvent used at the end of the washing is water. In particular, it is preferable to immerse in water. This is for removing organic solvent components such as alcohol.

Examples of drying methods include heating, air, and depressurization, and the drying methods are not particularly limited, but from the viewpoint of the simplicity of the manufacturing process, are preferably air drying or heat drying and more preferably air drying. The drying may be achieved by simply allowing the substrate to stand.

Examples of the sterilization treatment of the porous membrane include a high-pressure steam sterilization treatment. In particular, it is preferable to perform a treatment with high-temperature and high-pressure steam using an autoclave. Normally, a high-pressure steam sterilization treatment for a resin product is performed by treating the resin product with pressurized saturated steam in an environment of approximately 110° C. to 140° C. for 10 to 30 minutes. Examples of the autoclave used for the sterilization treatment include SS325 manufactured by TOMY SEIKO CO., LTD.

If necessary, the post-treated porous membrane is preferably further rolled up and stored for the purpose of transportation as a product or of processing.

<Application of Porous Membrane>

The porous membrane obtained by the manufacturing method of the present invention can be used in various applications as a filtration membrane. The filtration membrane is applied to the separation, purification, recovery, concentration, and the like of a liquid containing or suspending various polymers, microorganisms, yeasts, and fine particles, and particularly, can be applied to a case where it is necessary to separate fine particles from a liquid containing fine particles, which is required to filtration. For example, the filtration membrane can be used in a case where fine particles are separated from various suspensions, fermentation liquids, culture solutions, or the like, which contain fine particles, and suspensions of pigment. Specifically, the hydrophilic porous membrane according to the embodiment of the present invention can be used as a microfiltration membrane required for manufacturing pharmaceuticals in the pharmaceutical industry, manufacturing alcoholic beverages such as beer in the food industry, fine processing in the electronics industry, and manufacturing purified water.

In a case where the porous membrane having a pore diameter distribution is used as a filtration membrane, by arranging and filtering such that a portion having a smaller pore diameter is closer to a secondary side (outlet side of a filtrate), fine particles can be efficiently captured. In addition, in the porous membrane having a pore diameter distribution, fine particles introduced from the surface are removed by adsorption or adhesion before reaching the minimum pore diameter portion. Therefore, clogging hardly occurs, and high filtration efficiency can be maintained for a long period of time.

The porous membrane can be processed into a shape according to the application, and can be used for various applications. Examples of the shape of the hydrophilic porous membrane include flat membrane shape, tubular shape, hollow fiber shape, pleated shape, fibrous shape, spherical particle shape, crushed particle shape, and bulky continuous shape.

The porous membrane may be attached to a cartridge which is easily removable in devices used for various applications. It is preferable that the porous membrane is retained in the cartridge in a form capable of functioning as a filtration membrane. The cartridge retaining the porous membrane obtained by the manufacturing method of the present invention can be manufactured in the same manner as a known porous membrane cartridge, and regarding the manufacturing, reference can be made to WO2005/037413A and JP2012-045524A.

For example, a filter cartridge can be manufactured as follows.

A long porous membrane is pleated such that the porous membrane is creased in the short side (width) direction. For example, the porous membrane can be pleated by a known method, usually sandwiched between two membrane supports. As the membrane support, a non-woven fabric, a woven fabric, a net, or the like may be used. The membrane support functions to reinforce the filtration membrane against fluctuations in filtration pressure and to introduce liquid into the fold. It is sufficient that the width of the pleat fold is, for example, 5 mm to 25 mm. It is sufficient that the pleated porous membrane is rounded into a cylindrical shape, and the joint is sealed.

The cylindrical porous membrane is end-sealed to an end plate, and the end seal may be performed by a known method according to the material of the end plate. In a case where a thermosetting epoxy resin is used for the end plate, a liquid of a prepared epoxy resin adhesive may be poured into a positive mold and pre-cured so as to moderately increase the viscosity of the adhesive, one end surface of a cylindrical filter medium may be inserted into the epoxy adhesive, and then the liquid may be heated to be completely cured. In a case where the material of the end plate is a thermoplastic resin such as polypropylene or polyester, a method of inserting one end surface of the cylindrical filter medium into a hot-melted resin immediately after pouring the hot-melted resin into the mold may be performed. On the other hand, only a surface of the plate may be melted by contacting only the sealing surface of the formed end plate with a hot plate or irradiating with an infrared heater, and one end surface of the cylindrical filter medium may be pressed and welded to the molten surface of the plate.

The assembled filter cartridge may be further subjected to a known washing process.

In the filter cartridge, among water-soluble resins in the porous membrane, all or a part of the water-soluble resins which have not been insolubilized may be dissolved and removed in the solvent used in the washing process or the like.

EXAMPLES

Features of the present invention will be described in more detail with reference to the following examples and comparative examples. The materials, amounts used, proportions, treatment details, treatment procedures, and the like described in the following examples can be appropriately modified as long as the gist of the present invention is maintained. Therefore, the scope of the present invention should not be limitedly interpreted by the specific examples described below.

<Production of Porous Membrane>

[Production of Substrate]

(Polysulfone (PSf) Porous Membrane)

18 parts by mass of polysulfone (Udel P3500, manufactured by Solvay), 12 parts by mass of polyvinylpyrrolidone (K-50, manufactured by DKS Co., Ltd.), 0.5 parts by mass of lithium chloride, and 1 part by mass of water were dissolved in 68.5 parts by mass of N-methyl-2-pyrrolidone to obtain a mixture for forming a membrane. This mixture was cast on a surface of a PET film (film having a thickness of 70 µm after being melt-formed and stretched; roll shape having a width of 35 cm) so as to have a thickness of 140 µm. The surface of the cast liquid membrane was exposed to air adjusted to 25° C. and an absolute humidity of 9.9 g/kg (relative humidity: 50%), at a wind speed of 1.0 m/see for 2 seconds. Immediately thereafter, the exposed membrane surface was immersed in a coagulation liquid tank filled with water. The temperature of the coagulation liquid was set to 25° C.

Thereafter, the porous membrane formed in the coagulation liquid tank was peeled off from the PET film, and the peeled porous membrane was washed with a diethylene glycol solution at 80° C. for 2 minutes and then with pure water at 70° C. for 5 minutes. After the washed porous membrane was dried at 80° C. for 2 minutes, the membrane was wound around a paper tube winding core having an outer diameter of 76 mm (3 inches) and a thickness of 10 mm with a winding tension of 100 N with a side peeled off from the PET film inside, thereby obtaining a roll-shaped polysulfone porous membrane (Example 1) having a width of 30 cm. As a result of measuring the pore diameter of this porous membrane by the average pore diameter measurement described later, the pore diameter thereof was 0.2 µm.

Polysulfone porous membranes of each example shown in Table 1 were also manufactured in the same manner. The thickness of the polysulfone porous membrane was adjusted by the amount of the mixture for forming a membrane flowing on the surface of the PET film. The average pore diameter of the polysulfone porous membrane was adjusted by adjusting the moisture in the mixture for forming a membrane, and the relative humidity of the air.

(Polyethersulfone (PES) Porous Membrane)

A polyethersulfone porous membrane was obtained in the same manner as in the production of the polysulfone (PSf) porous membrane, except that polyethersulfone (Sumika Excel 5200P (manufactured by Sumitomo Chemical Co., Ltd.)) was used instead of polysulfone (Udel P3500, manufactured by Solvay), and the moisture in the polymer solution and the relative humidity of the air were adjusted.

(Polyphenylene Sulfide (PPhS) Porous Membrane)

A polyphenylene sulfide porous membrane was obtained in the same manner as in the production of the polysulfone (PSf) porous membrane, except that polyphenylene sulfide (Radel (registered trademark) R-5000 (manufactured by Solvay)) was used instead of polysulfone (Udel P3500, manufactured by Solvay), and the moisture in the polymer solution and the relative humidity of the air were adjusted.

(Polyvinylidene Fluoride (PVDF) Porous Membrane (PVP Added))

A commercially available PVDF membrane (MS (registered trademark) hydrophobic PVDF membrane 0.22 µm (manufactured by Membrane Solutions Limited)) was immersed in a 0.12% polyvinylpyrrolidone (PVP) solution (PITZCOL K-50) and dried to obtain a polyvinylidene fluoride porous membrane (PVP added).

(Polyvinylidene Fluoride Porous Membrane (PVA Added))

A commercially available PVDF membrane (MS (registered trademark) hydrophobic PVDF membrane 0.22 µm (manufactured by Membrane Solutions Limited)) was immersed in a 0.12% polyvinyl alcohol (PVA) solution (Poval (registered trademark) PVA203, manufactured by KURARAY CO., LTD.) and dried to obtain a polyvinylidene fluoride porous membrane (PVA added).

(Polyvinylidene Fluoride Porous Membrane (HPC Added))

A commercially available PVDF membrane (MS (registered trademark) hydrophobic PVDF membrane 0.22 µm (manufactured by Membrane Solutions Limited)) was immersed in a 0.12% hydroxypropyl cellulose (HPC) solution (HPC-SL, manufactured by NIPPON SODA CO., LTD.) and dried to obtain a porous membrane.

[Evaluation of Substrate]

(Content of Water-Soluble Resin)

The content (Table 1) of the water-soluble resin in the porous membrane was measured by a proton NMR method.

In a case of the porous membrane configured of polysulfone and polyvinylpyrrolidone, the membrane was dissolved in deuterated chloroform which dissolved both, and the integral value of 1.85 to 2.5 ppm attributable to polyvinylpyrrolidone and the integral value of polysulfone around 7.3 ppm were measured.

A calibration curve was prepared in which the mass ratio of polysulfone and polyvinylpyrrolidone was adjusted in advance, and the amount of the water-soluble resin was determined.

The proton NMR was performed at 300 MHz and 256 times of integration using Burker NMR300.

With regard to the polyethersulfone porous membrane, the polyphenylsulfone porous membrane, and the polyvinylidene fluoride porous membrane, the content of the water-soluble resin was evaluated by the calibration curve of the water-insoluble resin component and the hydrophilic resin by the same method.

(Average Pore Diameter)

The average pore diameter (Table 1) was obtained by a perm-porometer manufactured by POROUS MATERIALS (USA). In addition, the compact portion in the thickness direction of the membrane was determined by the above-described method using the electron microscope. As an example, the porous membrane of Example 1 had an average pore diameter of 0.2 μm, and the compact portion was located at a position of 130 μm from the surface peeled off from the PET film. The pore diameter increased from the compact portion to the surface peeled off from the PET film and the surface on the opposite side, and the porous membrane of Example 1 was a porous membrane in which the pore diameter near the surface peeled off from the PET film was larger than the pore diameter on the opposite side.

[Application of Water to Substrate and Electron Beam Irradiation]

The above-described substrate was unwound with a roller as shown in the process diagram of FIG. 1, and under the conditions shown in Table 1, treatments selected from water application, water removal, and electron beam irradiation were performed. The treated membrane was dried at 80° C. for 2 minutes and then wound to obtain a porous membrane. The electron beam irradiation was performed by a CB200 type electron beam irradiator manufactured by IWASAKI ELECTRIC CO., LTD.

In addition, the specific procedure of the water application method and the water removal method shown in Table 1 is as follows.

For the spray method, a quick fogger (manufactured by Spraying Systems Japan Co., Ltd.) was used as a spray nozzle. Two nozzles were arranged in the width direction in the portion 2 of FIG. 1, and the spray amount of the aqueous solvent was appropriately adjusted so that the aqueous solvent could be uniformly applied to the porous membrane. The substrate (porous membrane) formed on the PET film was sprayed from the same side as the electron beam irradiation side (shown in Table 1).

For the die-coating method, the extrusion type die of Example 1 of JP2003-164788A was used. The roller was prevented from contacting the opposite side of the coating surface for 100 mm after the portion to be coated on the porous membrane by die-coating. The substrate (porous membrane) formed on the PET film was coated from the same side as the electron beam irradiation side (shown in Table 1).

The immersion method was performed by installing a water tank in the portion 2 of FIG. 1. The roller was arranged in the water tank, and the porous membrane was immersed in an aqueous solvent for 1 minute.

As an air knife, a Kansai Electric Heat Corp. high blow nozzle 75SUS-300-1.0 was used. After the completion of the immersion, each of the air knives was arranged on both sides of the porous membrane between roller transport portions before the electron beam irradiation.

The squeeze was performed by wrapping a nylon cloth around a roller portion immediately after the water tank. The arrangement of the rollers was adjusted as appropriate and performed on both sides of the transported porous membrane.

Water having a temperature of 25° C. was used as the aqueous solvent.

In addition, after passing through the aqueous solvent application process 2 and the aqueous solvent removal process 3, sampling was performed from the position of the manufacturing line immediately before the electron beam irradiation process 4, the sampled sample was placed in a glass bottle and the mass was measured, and a water content W was calculated from a sampling mass Ws and an absolute dry mass Wd at a temperature of 115° C. by the following expression.

$$W=(Ws-Wd)/Wd$$

The obtained porous membrane was evaluated by the following items. The results are shown in Table 2.

(Insoluble Component Mass)

A dissolution test of the membrane was performed with methylene chloride, which dissolved polysulfone and polyvinylpyrrolidone.

A 60 cm² membrane was immersed in 50 mL of methylene chloride at room temperature for 24 hours. The presence or absence of insoluble components was visually observed.

The insoluble components were filtered through a 0.45 μm Teflon filter, and the mass of the filtration residue was measured. The insoluble component mass was shown by the mass ratio (%) of the residue to the original membrane mass.

(Suction Property after Washing)

Washing

Assuming the cartridge processing conditions for the porous membrane, the following washing and drying were performed.

First, the porous membrane was immersed in a mixed solution of water and ethanol in a mass ratio of 7:3 for 30 minutes. Thereafter, the porous membrane was washed with water for 5 minutes and dried at a temperature of 70° C. and a relative humidity of 99% for 26 hours.

Suction Property

In order to evaluate the wettability (hydrophilicity) of the porous membrane in the cartridge, the suction property of the porous membrane was evaluated.

One end of the porous membrane was immersed in a commercially available sugar-free coffee solution (Ajinomoto General Food Co., Ltd., Blendy (registered trademark) sugar-free coffee, in a PET bottle), and the height of the water sucked up from the water surface at one end was measured after 10 minutes.

The suction property is better as the numerical value is larger, and 10 mm or more is an acceptable level for the product, 20 mm or more is a passing level, and 50 mm or more is a desirable level. In a case of processing the filter cartridge, it is preferable that the suction property on a primary side (side to which the stock solution is applied) is large, and as described above, since the porous membrane formed on the support preferably has, as the primary side, the surface which is on the side of the support, it is preferable that the surface on the PET side has a high suction property.

(Water Flow)

A circle having a diameter of 47 mm was cut out from the porous membrane, and evaluated by the water permeability in a case where pure water was permeated under a pressure of 100 kPa. The volume of water flowing through the membrane per unit area for 1 minute was measured and determined as water permeability (ml/cm²/min).

(Wettability Unevenness after Washing)

The porous membrane was immersed in a mixed solution of water and ethanol in a mass ratio of 7:3 for 30 minutes.

Thereafter, the porous membrane was washed with water for 5 minutes and dried at a temperature of 70° C. and a relative humidity of 99% for 26 hours.

A water suction test was performed on the dried membrane for 10 minutes, and then the entire surface was immersed in water, and wettability unevenness of the membrane was observed and evaluated according to the following criteria.

Here, the wettability unevenness means a portion that is not uniformly wet by visual observation of the entire membrane because the inside of the membrane in the thickness direction is not wetted even in a case where the surface of the membrane is wetted.

A: there was no wettability unevenness of the membrane.
B: wettability unevenness was less than 20% of the membrane area.
C: wettability unevenness was 20% or more of the membrane area (failure).

(Wrinkle)

The formed membrane was cut out to a length of 1 m in the longitudinal direction, and the strength of wrinkles on the entire membrane in a case of being suspended was observed under a fluorescent lamp and evaluated according to the following criteria.

A: wrinkles were not visible.
B: weak galvanized iron-like wrinkles were visually observed along the membrane-forming direction of the membrane.

TABLE 1

| | Substrate | | | | | | | | | Electron beam irradiation | | | |
| | | | | | Pore | | | | | | | | |
| | Water-insoluble resin | Water-soluble resin (monomer unit of VP or VA) | Content of water-soluble resin [%] | Average pore diameter [μm] | Position of compact portion from PET side [μm] | Pore diameter anisotropy in thickness direction | Membrane thickness [μm] | Aqueous solvent application process | Aqueous solvent removal process | Water content during irradiation [%] | Irradiated surface A: opposite side B: PET side | Acceleration voltage [kV] | Irradiation dose [kGray] |
|---|---|---|---|---|---|---|---|---|---|---|---|---|---|
| Example 1 | PSf | PVP | 3 | 0.2 | 130 | Y | 140 | Spray | — | 400 | B | 125 | 200 |
| Comparative example 1 | PSf | PVP | 3 | 0.2 | 130 | Y | 140 | Spray | — | 400 | — | — | — |
| Comparative example 2 | PSf | PVP | 3 | 0.2 | 130 | Y | 140 | — | — | 2 | B | 125 | 200 |
| Comparative example 3 | PVDF | HPC | 0.5 | 0.2 | — | N | 110 | Spray | — | 300 | — | 125 | 200 |
| Example 2-1 | PES | PVP | 4 | 0.2 | 100 | Y | 140 | Spray | — | 400 | B | 125 | 200 |
| Example 2-2 | PPhS | PVP | 5 | 0.2 | 70 | Y | 140 | Spray | — | 400 | B | 125 | 200 |
| Example 2-5 | PVDF | PVP | 0.5 | 0.2 | — | N | 110 | Spray | — | 300 | — | 125 | 200 |
| Example 2-6 | PVDF | PVA | 0.5 | 0.2 | — | N | 110 | Spray | — | 300 | — | 125 | 200 |
| Example 3-1 | PSf | PVP | 3 | 0.2 | 130 | Y | 140 | Spray | — | 50 | B | 125 | 200 |
| Example 3-2 | PSf | PVP | 3 | 0.2 | 130 | Y | 140 | Spray | — | 100 | B | 125 | 200 |
| Example 3-3 | PSf | PVP | 3 | 0.2 | 130 | Y | 140 | Spray | — | 200 | B | 125 | 200 |
| Example 3-4 | PSf | PVP | 3 | 0.2 | 130 | Y | 140 | Spray | — | 500 | B | 125 | 200 |
| Example 3-5 | PSf | PVP | 3 | 0.2 | 130 | Y | 140 | Spray | — | 600 | B | 125 | 200 |
| Example 4-1 | PSf | PVP | 3 | 0.2 | 130 | Y | 140 | Immersion | — | 500 | B | 125 | 200 |
| Example 4-2 | PSf | PVP | 3 | 0.2 | 130 | Y | 140 | Die | — | 400 | B | 125 | 200 |
| Example 5-1 | PSf | PVP | 3 | 0.2 | 130 | Y | 140 | Immersion | Air knife | 400 | B | 125 | 200 |
| Example 5-2 | PSf | PVP | 3 | 0.2 | 130 | Y | 140 | Immersion | Squeeze | 400 | B | 125 | 200 |
| Example 6-1 | PSf | PVP | 3 | 0.2 | 2 | Y | 10 | Spray | — | 400 | B | 100 | 50 |
| Example 6-2 | PSf | PVP | 3 | 0.2 | 30 | Y | 40 | Spray | — | 400 | B | 100 | 100 |
| Example 6-3 | PSf | PVP | 3 | 0.2 | 280 | Y | 300 | Spray | — | 400 | B | 125 | 200 |
| Example 6-4 | PSf | PVP | 3 | 0.2 | 480 | Y | 500 | Spray | — | 400 | B | 125 | 200 |
| Example 7-1 | PSf | PVP | 3 | 0.2 | 130 | Y | 140 | Spray | — | 400 | B | 100 | 30 |
| Example 7-2 | PSf | PVP | 3 | 0.2 | 130 | Y | 140 | Spray | — | 400 | B | 100 | 50 |
| Example 7-3 | PSf | PVP | 3 | 0.2 | 130 | Y | 140 | Spray | — | 400 | B | 100 | 100 |
| Example 7-4 | PSf | PVP | 3 | 0.2 | 130 | Y | 140 | Spray | — | 400 | B | 100 | 200 |
| Example 7-5 | PSf | PVP | 3 | 0.2 | 130 | Y | 140 | Spray | — | 400 | B | 150 | 200 |
| Example 7-6 | PSf | PVP | 3 | 0.2 | 130 | Y | 140 | Spray | — | 400 | B | 150 | 280 |
| Example 7-7 | PSf | PVP | 3 | 0.2 | 130 | Y | 140 | Spray | — | 400 | B | 150 | 300 |
| Example 8-1 | PSf | PVP | 3 | 0.2 | 130 | Y | 140 | Spray | — | 400 | B | 125 | 200 |
| Example 8-2 | PSf | PVP | 3 | 0.2 | 130 | Y | 140 | Spray | — | 400 | A | 150 | 200 |
| Example 9-1 | PSf | PVP | 3 | 0.03 | 132 | Y | 140 | Spray | — | 400 | B | 125 | 200 |
| Example 9-2 | PSf | PVP | 3 | 0.7 | 130 | Y | 170 | Spray | — | 400 | B | 125 | 200 |
| Example 9-3 | PSf | PVP | 3 | 1.2 | 115 | Y | 140 | Spray | — | 400 | B | 125 | 200 |
| Example 10-1 | PSf | PVP | 1.5 | 0.2 | 130 | Y | 140 | Spray | — | 400 | B | 125 | 200 |
| Example 10-2 | PSf | PVP | 8 | 0.2 | 130 | Y | 140 | Spray | — | 400 | B | 125 | 200 |
| Example 10-3 | PSf | PVP | 12 | 0.2 | 130 | Y | 140 | Spray | — | 400 | B | 125 | 200 |
| Example 10-4 | PSf | PVP | 20 | 0.2 | 130 | Y | 140 | Spray | — | 400 | B | 125 | 200 |

TABLE 2

| | Suction property after washing membrane [mm] | | Water flow after washing membrane [ml/cm²/min] | Water flow ratio after washing/before washing | Wettability unevenness after washing membrane | Wrinkle | Insoluble component weight [% by mass] |
|---|---|---|---|---|---|---|---|
| | Surface on PET side | Surface on opposite side | | | | | |
| Example 1 | 55 | 32 | 52 | 95% | A | A | 3.6 |
| Comparative example 1 | 1 | 1 | 1 | 2% | C | A | None |
| Comparative example 2 | 1 | 1 | 2 | 4% | C | A | None |
| Comparative example 3 | 5 | 5 | 3 | 50% | B | A | None |
| Example 2-1 | 50 | 25 | 35 | 85% | A | A | 3.3 |
| Example 2-2 | 35 | 30 | 30 | 80% | A | A | 4.2 |
| Example 2-5 | 20 | 20 | 8 | 80% | A | A | 0.5 |
| Example 2-6 | 15 | 15 | 6 | 60% | A | A | 0.5 |
| Example 3-1 | 35 | 15 | 30 | 55% | B | A | 1.9 |
| Example 3-2 | 50 | 20 | 48 | 87% | A | A | 3.5 |
| Example 3-3 | 53 | 33 | 52 | 95% | A | A | 3.8 |
| Example 3-4 | 52 | 30 | 52 | 95% | A | A | 3.7 |
| Example 3-5 | 50 | 28 | 50 | 91% | B | B | 3.6 |
| Example 4-1 | 50 | 28 | 50 | 91% | B | B | 3.4 |
| Example 4-2 | 54 | 32 | 51 | 93% | A | A | 3.5 |
| Example 5-1 | 50 | 28 | 49 | 89% | A | A | 3.2 |
| Example 5-2 | 50 | 28 | 48 | 87% | A | A | 3.1 |
| Example 6-1 | 50 | 48 | 60 | 98% | A | B | 1.1 |
| Example 6-2 | 55 | 50 | 58 | 98% | A | A | 2.9 |
| Example 6-3 | 52 | 20 | 45 | 85% | A | A | 3.0 |
| Example 6-4 | 50 | 10 | 30 | 50% | B | A | 2.8 |
| Example 7-1 | 12 | 10 | 6 | 11% | A | A | 0.9 |
| Example 7-2 | 16 | 12 | 15 | 27% | A | A | 1.2 |
| Example 7-3 | 28 | 16 | 30 | 55% | A | A | 3.0 |
| Example 7-4 | 56 | 22 | 40 | 73% | A | A | 3.2 |
| Example 7-5 | 55 | 59 | 55 | 100% | A | A | 3.4 |
| Example 7-6 | 50 | 57 | 55 | 100% | A | A | 3.5 |
| Example 7-7 | 48 | 55 | 53 | 95% | A | B | 3.6 |
| Example 8-1 | 20 | 47 | 53 | 96% | A | A | 3.7 |
| Example 8-2 | 27 | 55 | 55 | 100% | A | A | 3.8 |
| Example 9-1 | 35 | 30 | 6 | 120% | A | A | 3.6 |
| Example 9-2 | 55 | 30 | 240 | 95% | A | A | 1.9 |
| Example 9-3 | 70 | 60 | 430 | 93% | A | A | 1.8 |
| Example 10-1 | 45 | 25 | 40 | 150% | A | A | 1.4 |
| Example 10-2 | 52 | 30 | 40 | 200% | A | A | 3.7 |
| Example 10-3 | 51 | 30 | 20 | 400% | A | A | 3.9 |
| Example 10-4 | 50 | 28 | 15 | 700% | A | A | 4.0 |

Furthermore, in a case where the amount of elution after washing was measured as follows with regard to the obtained porous membranes in Example 1 and Comparative Example 1, the result of Example 1 was 0.46% and the result of Comparative Example 1 was 1.61%. As a result, it was found that the amount of elution of membrane components was reduced in the porous membrane obtained by the manufacturing method of the present invention.

(Washing)

Assuming the cartridge processing conditions for the porous membrane, the following washing and drying were performed.

First, the porous membrane was immersed in a mixed solution of water and ethanol in a mass ratio of 7:3 for 30 minutes. Thereafter, the porous membrane was washed with water for 5 minutes and dried at a temperature of 70° C. and a relative humidity of 99% for 26 hours.

(Evaluation of Elution Amount)

A 1600 cm² of the washed porous membrane was refluxed with a mixed solvent of water and ethanol (mass ratio: 5:5) for 6 hours. The solution after reflux was dried at 105° C. to be solidified, and the elution amount was measured to obtain the ratio to the original membrane mass.

EXPLANATION OF REFERENCES

1: unwinding
2: aqueous solvent application process
3: aqueous solvent removal process
4: electron beam irradiation process
5: post-treatment process
6: winding

What is claimed is:

1. A method for manufacturing a porous membrane, comprising:
   preparing, as a substrate, a membrane having a plurality of pores, which includes a water-insoluble resin and a water-soluble resin including a monomer unit of polyvinylpyrrolidone or a monomer unit of polyvinyl alcohol; and
   irradiating the substrate with an electron beam in the presence of an aqueous solvent to crosslink at least a part of the water-soluble resin,
   which further comprises
   in the preparation of the substrate, casting a solution including the water-insoluble resin and the water-soluble resin on a support to form the membrane having a plurality of pores on the support, the membrane having a layered compact portion with a minimum pore diameter inside the membrane,
wherein a thickness of the substrate is 40 μm or more and the electron beam irradiation is performed at an absorbed dose of 50 kGray or more,
the water-soluble resin is included in an amount of 0.5% to 10% by mass of the dry mass of the porous membrane, and
an insoluble component which is a cross-linked water-soluble resin is 1.2% by mass or more of a dry mass of the porous membrane, said mass percentage being obtained by immersing 60 cm² of the porous membrane in 50 mL of methylene chloride for 24 hours, measuring the mass of the insoluble component and determining the percentage of the insoluble component based on the dry mass of the porous membrane before the immersion.

2. The manufacturing method according to claim 1, wherein the water-insoluble resin includes at least one selected from the group consisting of polysulfone, polyethersulfone, polyphenylsulfone, polyarylate, polyimide, and polyvinylidene fluoride.

3. The manufacturing method according to claim 2, wherein the water-insoluble resin is polysulfone or polyethersulfone.

4. The manufacturing method according to claim 2, wherein the water-soluble resin is polyvinylpyrrolidone.

5. The manufacturing method according to claim 3, wherein the water-soluble resin is polyvinylpyrrolidone.

6. The manufacturing method according to claim 1, wherein the water-insoluble resin is polyphenylene sulfide and the water-soluble resin is polyvinylpyrrolidone.

7. The manufacturing method according to claim 1, wherein, in the electron beam irradiation, the substrate includes the aqueous solvent in an amount of 50% by mass to 500% by mass of a dry mass of the substrate.

8. The manufacturing method according to claim 1, wherein the aqueous solvent is applied to the substrate by spray-coating or die-coating.

9. The manufacturing method according to claim 8, wherein the aqueous solvent is applied from a surface side which is a side of the support in the preparation of the substrate.

10. The manufacturing method according to claim 1, further comprising:
applying the aqueous solvent to the substrate by immersing the substrate in the aqueous solvent, and after application of the aqueous solvent, removing excess aqueous solvent on a surface of the substrate.

11. The manufacturing method according to claim 1, wherein a thickness of the substrate is 40 μm to 300 μm.

12. The manufacturing method according to claim 1, wherein the electron beam irradiation is performed at an absorbed dose of 50 kGray to 300 kGray.

13. The manufacturing method according to claim 1, wherein the electron beam irradiation is performed from a surface side which is a side of the support in the preparation of the substrate.

14. A porous membrane comprising:
a water-insoluble resin; and
a water-soluble resin including a monomer unit of polyvinylpyrrolidone or a monomer unit of polyvinyl alcohol,
wherein an insoluble component which is a cross-linked water-soluble resin is 1.2% by mass or more of a dry mass of the porous membrane, said mass percentage being obtained by immersing 60 cm² of the porous membrane in 50 mL of methylene chloride for 24 hours, measuring the mass of the insoluble component and determining the percentage of the insoluble component based on the dry mass of the porous membrane before the immersion,
the water-soluble resin is included in an amount of 0.5% to 10% by mass of the dry mass of the porous membrane,
the porous membrane has a layered compact portion with a minimum pore diameter inside the membrane, and
a thickness of the porous membrane is 40 μm or more.

15. The porous membrane according to claim 14, wherein the water-insoluble resin includes at least one selected from the group consisting of polysulfone, polyethersulfone, and polyphenylsulfone.

16. The porous membrane according to claim 14, wherein the water-insoluble resin is polysulfone or polyethersulfone.

17. The porous membrane according to claim 15, wherein the water-soluble resin is polyvinylpyrrolidone.

18. The porous membrane according to claim 14, wherein the water-insoluble resin is polyphenylene sulfide and the water-soluble resin is polyvinylpyrrolidone.

19. The porous membrane according to claim 14, wherein a thickness of the porous membrane is 40 μm to 300 μm.

20. The porous membrane according to claim 14, wherein the water-soluble resin is included in an amount of 0.5% to 3% by mass of the dry mass of the porous membrane.

21. The porous membrane according to claim 14, wherein a thickness of the porous membrane is more than 40 μm.

22. The porous membrane according to claim 14, wherein a thickness of the porous membrane is 140 μm or more.

23. A porous membrane comprising:
a water-insoluble resin; and
a water-soluble resin including a monomer unit of polyvinylpyrrolidone or a monomer unit of polyvinyl alcohol,
wherein an insoluble component which is a cross-linked water-soluble resin is 1.2% by mass or more of a dry mass of the porous membrane, said mass percentage being obtained by immersing 60 cm² of the porous membrane in 50 mL of methylene chloride for 24 hours, measuring the mass of the insoluble component and determining the percentage of the insoluble component based on the dry mass of the porous membrane before the immersion,
the porous membrane has a layered compact portion with a minimum pore diameter inside the membrane, and
a thickness of the porous membrane is more than 40 μm.

24. The porous membrane according to claim 23, wherein a thickness of the porous membrane is 140 μm or more.

* * * * *